United States Patent
Li et al.

(10) Patent No.: US 12,034,292 B2
(45) Date of Patent: *Jul. 9, 2024

(54) ADJUSTABLE SPEED DRIVE WITH INTEGRATED SOLID-STATE CIRCUIT BREAKER AND METHOD OF OPERATION THEREOF

(71) Applicant: Eaton Intelligent Power Limited, Dublin (IE)

(72) Inventors: Huaqiang Li, Menomonee Falls, WI (US); Seth O'Brien, Wauwatosa, WI (US); Thomas M. Ruchti, Pewaukee, WI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,062

(22) Filed: Apr. 7, 2023

(65) Prior Publication Data

US 2023/0246435 A1 Aug. 3, 2023

Related U.S. Application Data

(63) Continuation of application No. 17/484,755, filed on Sep. 24, 2021, now Pat. No. 11,631,973, which is a
(Continued)

(51) Int. Cl.
*H02H 7/08* (2006.01)
*H02H 3/20* (2006.01)
(Continued)

(52) U.S. Cl.
CPC .......... *H02H 7/0833* (2013.01); *H02H 3/202* (2013.01); *H02H 7/1216* (2013.01);
(Continued)

(58) Field of Classification Search
CPC .... H02H 7/0833; H02H 7/125; H02H 7/1216; H02H 3/202; H02M 5/4585; H02M 1/32; H02M 7/2173; H02M 1/08
(Continued)

(56) References Cited

U.S. PATENT DOCUMENTS

| | | | | |
|---|---|---|---|---|
| 4,709,292 A | * | 11/1987 | Kuriyama | ............ H02H 7/0833 |
| | | | | 361/72 |
| 4,749,932 A | * | 6/1988 | Yonemoto | ............... H02P 23/08 |
| | | | | 318/762 |

(Continued)

FOREIGN PATENT DOCUMENTS

| CN | 201601605 U | 10/2010 |
|---|---|---|
| CN | 103346668 A | 10/2013 |

(Continued)

OTHER PUBLICATIONS

Derwent: 1996-053466; Inventor: Yatsusu Y; Title: Surge protection circuit for DC-DC converter rectifier diode has snubber capacitor which protects rectifier diode from surge (Year: 1995).

(Continued)

*Primary Examiner* — Dharti H Patel
(74) *Attorney, Agent, or Firm* — DiBerardino McGovern IP Group LLC

(57) ABSTRACT

A power conversion circuit having a solid-state circuit breaker integrated therein is disclosed. With a disconnect switch between a utility source and the power conversion apparatus described for meeting UL489, the power conversion circuit includes an input connectable to an AC source, a rectifier circuit connected to the input to convert an AC power input to a DC power, and a DC link coupled to the rectifier circuit to receive the DC power therefrom. The rectifier circuit comprises a plurality of phase legs each including thereon an upper switching unit and a lower switching unit, wherein at least one of the upper and lower (Continued)

switching units on each phase leg comprises a bi-directional switching unit that selectively controls current and withstands voltage in both directions, so as to provide a circuit breaking capability that selectively interrupts current flow through the rectifier circuit, while maintaining original power conversion functionalities.

20 Claims, 10 Drawing Sheets

Related U.S. Application Data continuation of application No. 15/692,451, filed on Aug. 31, 2017, now Pat. No. 11,152,780.

(51) Int. Cl.
- H02H 7/12 (2006.01)
- H02H 7/125 (2006.01)
- H02M 1/08 (2006.01)
- H02M 1/32 (2007.01)
- H02M 5/458 (2006.01)
- H02M 7/217 (2006.01)

(52) U.S. Cl.
CPC .............. *H02H 7/125* (2013.01); *H02M 1/08* (2013.01); *H02M 1/32* (2013.01); *H02M 5/4585* (2013.01); *H02M 7/2173* (2013.01)

(58) Field of Classification Search
USPC ......................................................... 361/18
See application file for complete search history.

(56) References Cited

U.S. PATENT DOCUMENTS

| | | | | | |
|---|---|---|---|---|---|
| 5,209,075 | A | * | 5/1993 | Kim | F24F 11/86 361/22 |
| 5,663,627 | A | * | 9/1997 | Ogawa | F24F 11/86 318/803 |
| 5,793,623 | A | * | 8/1998 | Kawashima | H02P 27/08 363/56.05 |
| 6,072,302 | A | * | 6/2000 | Underwood | H02J 3/38 322/17 |
| 6,396,721 | B1 | * | 5/2002 | Sonoda | H02M 5/4585 363/56.02 |
| 6,747,458 | B2 | * | 6/2004 | Huber | H02M 1/32 324/509 |
| 7,301,743 | B2 | | 11/2007 | Rozine et al. | |
| 7,394,627 | B2 | * | 7/2008 | Bruckmann | H02M 5/458 361/18 |
| 8,259,426 | B2 | * | 9/2012 | Xiao | H02M 5/4505 361/88 |
| 8,693,170 | B2 | | 4/2014 | Barreau et al. | |
| 9,407,133 | B1 | * | 8/2016 | Alexander | H02M 7/797 |
| 2003/0098668 | A1 | * | 5/2003 | Jadric | H02M 7/53873 318/801 |
| 2006/0158197 | A1 | * | 7/2006 | Horikoshi | G01R 31/343 324/551 |
| 2009/0052106 | A1 | * | 2/2009 | Fuchs | F04D 5/005 361/139 |
| 2009/0109713 | A1 | * | 4/2009 | Schnetzka | H02M 5/4585 361/699 |
| 2012/0063181 | A1 | * | 3/2012 | Chimento | H02J 3/1857 363/56.03 |
| 2012/0081064 | A1 | * | 4/2012 | Leaver | H02P 23/26 318/721 |
| 2013/0293988 | A1 | * | 11/2013 | Li | H02P 29/027 361/30 |
| 2013/0314953 | A1 | * | 11/2013 | Cuzner | H02M 1/12 363/80 |
| 2014/0125252 | A1 | * | 5/2014 | Wu | H05B 45/385 315/307 |
| 2014/0307490 | A1 | * | 10/2014 | Sagona | H02H 7/1252 363/52 |
| 2014/0320056 | A1 | * | 10/2014 | Royak | H02M 1/126 318/504 |
| 2015/0098258 | A1 | * | 4/2015 | Park | H02H 7/1216 363/37 |
| 2015/0155716 | A1 | * | 6/2015 | Balda | H02M 7/7575 363/35 |
| 2015/0219378 | A1 | * | 8/2015 | Crane | F25B 49/022 62/201 |
| 2015/0311696 | A1 | * | 10/2015 | Zhu | H02H 3/207 361/21 |
| 2015/0349681 | A1 | * | 12/2015 | Liu | H02P 27/06 318/400.21 |
| 2016/0099658 | A1 | * | 4/2016 | Ishimaru | H02M 7/219 310/68 D |
| 2016/0126824 | A1 | | 5/2016 | Cuzner et al. | |
| 2017/0045249 | A1 | * | 2/2017 | Lee | H02K 11/33 |
| 2017/0111000 | A1 | * | 4/2017 | Saito | H02P 27/06 |
| 2017/0141709 | A1 | * | 5/2017 | Fukuda | H02P 6/182 |
| 2017/0271979 | A1 | * | 9/2017 | McDougle | H05B 45/382 |
| 2018/0019655 | A1 | * | 1/2018 | Amirabadi | H02M 7/4826 |
| 2018/0191238 | A1 | * | 7/2018 | Tsuchiya | H02M 1/32 |
| 2018/0367060 | A1 | * | 12/2018 | Mnich | H02M 7/505 |
| 2019/0067932 | A1 | * | 2/2019 | Li | H02H 7/125 |
| 2019/0123656 | A1 | * | 4/2019 | Sone | H02M 3/1584 |
| 2019/0199086 | A1 | * | 6/2019 | Li | H02M 7/003 |
| 2019/0222135 | A1 | * | 7/2019 | Sakakibara | H02M 1/4225 |
| 2023/0162937 | A1 | * | 5/2023 | Telefus | H02M 1/32 361/2 |

FOREIGN PATENT DOCUMENTS

| | | | |
|---|---|---|---|
| CN | 103474964 | A | 12/2013 |
| CN | 204810156 | U | 11/2015 |
| CN | 105897005 | A | 8/2016 |
| CN | 106125012 | A | 11/2016 |
| JP | 07298603 | A | * 11/1995 |
| KR | 20160110621 | A | 9/2016 |
| WO | 2008137276 | A1 | 11/2008 |
| WO | 2016024223 | A1 | 2/2016 |
| WO | 2016177398 | A1 | 11/2016 |

OTHER PUBLICATIONS

Yatsusu; JP-07298603; Apr. 1994; Surge protection circuit for DC=DC converter rectifier diode has snubber capacitor which protects rectifier diode from surge; abstract, specification and drawings. (Year: 1994).
WO2016/024223, Cerqueira Pinto; Publication Date: Feb. 18, 2016; Title: AC/DC converter with three to single phase matrix converter, full bridge AC/DC converter and HF transformer; (Year: 2016).
CN 105897005; Title; Dual level matrix of frequency converter with fault tolerance; Date: May 26, 2016 (Year: 2016).
"Adjustable Speed Electrical Power Drive Systems,—Part 5-1," UL LLC, 2013, pp. 1-6.
"Code Changes Affecting Short-Circuit Current Ratings Based on the 2017 NEC," Eaton Bussmann Series, 2016, pp. 1-28.
"The Atom Switch . . . A Revolution in Power Distribution," Atom Power, Inc., 2017, p. 1.
Meyer et al., "Solid-State Circuit Breakers and Current Limiters for Medium-Voltage Systems Having Distributed Power Systems," IEEE Transactions on Power Electronics, vol. 19, No. 5, Sep. 2004, pp. 1333-1340.
Kempkes et al., "Solid-State Circuit Breakers for Medium Voltage DC Power," Diversified Technologies, Inc., Bedford, MA, May 2011, pp. 1-4.
"Solid State Breakers," Thycon Industrial PTY Ltd., Australia, 2005, pp. 1-8.
Gu et al., "Semiconductor Devices in Solid-State/Hybrid Circuit Breakers: Current Status and Future Trends," MDPI, Energies 2017, pp. 1-25.
Mila Palukova, European International Searching Authority, International Search Report and Written Opinion, counterpart PCT Application No. PCT/EP2018/073401, mailed Dec. 5, 2018, 17 pages total.

(56) References Cited

OTHER PUBLICATIONS

Dharti Haridas Patel, U.S. Patent and Trademark Office, Non-Final Office Action, parent U.S. Appl. No. 15/692,451, mailed Aug. 2, 2019, 9 pages total.
Dharti Haridas Patel, U.S. Patent and Trademark Office, Non-Final Office Action, parent U.S. Appl. No. 15/692,451, mailed Feb. 4, 2020, 10 pages total.
Dharti Haridas Patel, U.S. Patent and Trademark Office, Non-Final Office Action, parent U.S. Appl. No. 15/692,451, mailed Aug. 6, 2020, 13 pages total.
Dharti Haridas Patel, U.S. Patent and Trademark Office, Non-Final Office Action, parent U.S. Appl. No. 15/692,451, mailed Feb. 18, 2021, 11 pages total.
Office Action, counterpart Chinese Patent Application No. 201880053827.5 mailed Jan. 12, 2022, 27 pages total (including English translation of 15 pages).
Office Action, counterpart Chinese Patent Application No. 201880053827.5 mailed Sep. 29, 2022, 29 pages total (including English translation of 17 pages).

\* cited by examiner

ADJUSTABLE SPEED DRIVE WITH INTEGRATED SOLID-STATE CIRCUIT BREAKER AND METHOD OF OPERATION THEREOF

CROSS-REFERENCE TO RELATED APPLICATION

This application is a continuation of U.S. patent application Ser. No. 17/484,755, filed Sep. 24, 2021 and titled ADJUSTABLE SPEED DRIVE WITH INTEGRATED SOLID-STATE CIRCUIT BREAKER AND METHOD OF OPERATION THEREOF, which is a continuation of U.S. patent application Ser. No. 15/692,451, filed Aug. 31, 2017 and titled ADJUSTABLE SPEED DRIVE WITH INTEGRATED SOLID-STATE CIRCUIT BREAKER AND METHOD OF OPERATION THEREOF, now U.S. Pat. No. 11,152,780, each of which is incorporated herein by reference in its entirety.

BACKGROUND OF THE INVENTION

The present invention relates generally to adjustable speed drive (ASD) circuits and, more particularly, to an ASD having a solid-state circuit breaker integrated therein and method of operation thereof.

One type of system commonly used in industry that performs power conversion is an ASD circuit, also known as a variable frequency drive (VFD) circuit. An ASD is an industrial control device that provides for variable frequency, variable voltage operation of a driven system, such as an AC induction motor. A typical ASD circuit 10 is illustrated in FIG. 1. ASD or VFD circuit 10 includes an electromagnetic interference (EMI) filter 12 provided between a drive input 14 and input rectifier terminals 16. The terminals are connected to a rectifier bridge 18 that converts an AC input power provided at drive input 14 into a DC power, with the rectifier bridge 18 being in the form of an "uncontrolled" rectifier bridge that includes an arrangement of six diodes 20—with a pair of diodes 20 arranged in series on each of the three input phases. The ASD circuit 10 additionally includes a DC link 22 that receives the DC power from rectifier bridge 18; a DC link capacitor bank 24 having one or more capacitors 26, 28 across DC link 22; two inductors 30 (i.e., a DC choke) coupled in series with and on either side of the rectifier bridge 18 on DC link 22; a brake chopper 32 to discharge the DC link capacitor bank 24; an inverter 34 to convert the DC power to AC power; an output 36 coupled to the inverter 34; and resistors 38 arranged in parallel with capacitors 26, 28 across the DC link 22 in order to balance voltages of the capacitors 26, 28 and discharge them after power-off. While not shown in FIG. 1, it is known that the ASD circuit may also include a pre-charge circuit to control and limit inrush current into DC link capacitor bank 24 during power up.

With regard to the operation of ASD circuits, it is recognized that a number of tests and standards are set forth regarding the safety and functionality of the ASD circuit, and that such tests must be passed in order to judge the circuit as being compliant with such standards. Standard UL61800-5-1 is the governing safety standard for ASD circuits in the United States and is used to validate any claimed short circuit rating for the drive, such as 100 kA for example. Standard UL61800-5-1 requires that an ASD circuit under a breakdown of components test not catch fire or experience another unacceptable failure. That is, it is recognized that a breakdown of components test may cause a short circuit across a capacitor that will cause the ASD circuit to fail and, if power is allowed to continue to flow to the capacitor bank when one capacitor has a short circuit, an overvoltage condition will exist on the non-shorted capacitor. This overvoltage condition may, in electrolytic capacitors, cause the non-shorted capacitor to catch on fire and possibly explode.

Traditionally, a breakdown of components test of an ASD circuit for determining compliance with UL61800-5-1 has been performed using either a fuse or a circuit breaker 40 external to the ASD circuit 10 (i.e., external to a housing 42 thereof), along with a separate switch (e.g., contactor) 41 used specifically for the test, as shown in FIG. 1. In the event that a short circuit occurs during testing, the contactor 41 functions to short out the +/−DC link in order to introduce the fault as required in UL61800-5-1. However, it is recognized that traditional circuit breakers having a finite response time and will let through energy from the source to the ASD circuit when a component short circuit inside the drive occurs. Accordingly, even with the presence of a circuit breaker, it is possible that a damage to the ASD circuit may occur due to overstressed components such as rectifier diode or capacitor failures, as the additional energy that flows to the drive during the circuit breaker response time may be enough to cause such component failure.

More recently, solid-state circuit breakers have been developed to replace traditional circuit breakers, with such solid-state circuit breakers beneficially having a shorter response time as compared to traditional circuit breakers. The use of a solid-state circuit breaker in a breakdown of components test of an ASD circuit for determining compliance with UL61800-5-1 thus presents an improvement over tests performed with a traditional circuit breaker. However, it is recognized that use of solid-state circuit breakers for providing protection to an ASD circuit still does not prevent an optimal solution. That is, as the solid-state circuit breaker is still external to the ASD circuit, introducing higher cabling and installation costs, as well as more real estate. Additionally, existing solid-state circuit breakers may not provide protection at higher sustained current levels, such as might occur with in-rush current that is present during start-up of the motor/load, as the solid-state switches in the breaker are always fully gated On and may experience overlong thermal stresses. Accordingly, the solid-state circuit breaker may not be suitable to protect against sustained inrush currents in motor starting applications, which may be 6-7× higher than the rated current.

As described above, it is recognized that existing electro-mechanical circuit breaker designs external to the ASD circuit fail to provide adequate and comprehensive protection to the ASD circuit during a breakdown of components, during ongoing operation of the drive. Furthermore, the existing solid state circuit breakers fail to provide adequate protection during a motor starter application. Furthermore, it is recognized that the architecture of the ASD circuit 10 itself lacks the means to provide sufficient protection against a short circuit across DC capacitor(s) 26, 28 in DC capacitor bank 24 that could damage ASD circuit and against other various internal and external fault conditions. That is, controlling of the fault current or overvoltage condition in the ASD circuit 10 is not possible, as diodes 20 of rectifier bridge 18 cannot be controlled to turn off, such that power can continue to pass through rectifier bridge 18 to DC capacitor bank 24 while a capacitor is shorted, as illustrated in FIG. 1 via a path along which a short circuit current flows through the ASD circuit 10, i.e., through diode rectifier circuit 18 and then through capacitor bank 24. In another fault situation, the overvoltage condition on the non-shorted capacitor 26, 28 will cause ASD circuit 10 to be damaged, such that the damaged ASD circuit 10 will not be useable and a user will have to make costly repairs to the ASD circuit or replace the ASD circuit. The user will incur additional economic losses during the downtime period when ASD circuit 10 is not in use. While the ASD circuit architecture of FIG. 1 may be modified to replace the passive diode rectifier circuit 18 with an active rectifier circuit 44 that includes solid-state switches 46 therein in addition to diodes 20, such as shown in the embodiment of FIG. 2, the active rectifier circuit 44 still cannot prevent fault current from traveling through diodes 20, as shown in the short circuit current path illustrated therein.

It would therefore be desirable to provide a system and method for protecting an ASD circuit during a breakdown of components test, to prevent the circuit from catching fire or experiencing other failures due to a fault condition therein, according to the requirements of Standard UL61800-5-1. It would also be desirable for such a system and method to protect the ASD circuit against fault conditions that could damage the ASD circuit during transient and/or steady state operation thereof.

BRIEF DESCRIPTION OF THE INVENTION

Embodiments of the invention are directed to an ASD circuit with an integrated solid-state circuit breaker and method of operation thereof. The ASD circuit and integrated solid-state circuit breaker removes the need for installing an external circuit breaker, achieving system flexibility, providing increased protection, and reducing total cost of ownership.

In accordance with one aspect of the invention, a power conversion circuit includes an input connectable to an AC source, a rectifier circuit connected to the input to convert an AC power input to a DC power, and a DC link coupled to the rectifier circuit to receive the DC power therefrom. The rectifier circuit comprises a plurality of phase legs each including thereon an upper switching unit and a lower switching unit, wherein at least one of the upper and lower switching units on each phase leg comprises a bi-directional switching unit that selectively controls current and withstands voltage in both directions, so as to provide a circuit breaking capability that selectively interrupts current flow through the rectifier circuit.

In accordance with another aspect of the invention, a method of providing circuit breaking in a power conversion circuit includes receiving an AC power at an input of the power conversion circuit and measuring or determining, via a detection circuit and logic circuit of the power conversion circuit, one or more current and voltage parameters of power provided to the power conversion circuit or present in the power conversion circuit. The method also includes comparing, via the detection circuit or logic circuit, the one or more current and voltage parameters to one or more respective current and voltage thresholds, and identifying, via the logic circuit, a fault condition in the power conversion circuit if the one or more measured or determined current and voltage parameters exceed the one or more respective current and voltage thresholds. The method further includes controlling, via the logic circuit, a solid-state circuit breaker integrated into the power conversion circuit to interrupt current flow through the power conversion circuit upon identification of the fault condition.

In accordance with yet another aspect of the invention, an ASD circuit includes an input connectable to an AC source, a rectifier bridge with integrated solid-state circuit breaker connected to the input to convert an AC power input to a DC power, and a DC link coupled to the rectifier bridge to receive a DC link voltage therefrom. The rectifier bridge with integrated solid-state circuit breaker comprises a plurality of phase legs each including thereon an upper switching unit and a lower switching unit, wherein at least one of the upper and lower switching units on each phase leg is configured to control current and withstand voltage in both directions and allow for the selective interruption of current flow through the respective switching unit.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention relate to a system and method for preventing component failure and damage in a power conversion circuit responsive to a fault condition. A solid-state circuit breaker is integrated into the power conversion circuit to provide protection thereto, with the solid-state circuit breaker interrupting a fault current in the power conversion circuit upon detection of a fault condition. The integrated solid-state circuit breaker therefore acts to limit the damage to components in the power conversion circuit, such as during a shortage in a capacitor bank on the DC link thereof.

While embodiments of the invention are described and illustrated hereinbelow as being directed to ASD or VFD circuit and the integration of a solid-state circuit breaker into such circuits, it is recognized that embodiments of the invention are not meant to be limited to such circuits. That is, embodiments of the invention may be extended more generally to power/energy conversion circuits of varying constructions and implementations, including uninterruptible power supplies (UPS), DC-AC power converters, and power/energy conversion circuits for driving non-motor loads, for example. Accordingly, the following discussion of the integration of a solid-state circuit breaker into ASD/VFD circuits is not meant to limit the scope of the invention.

Figure 1:
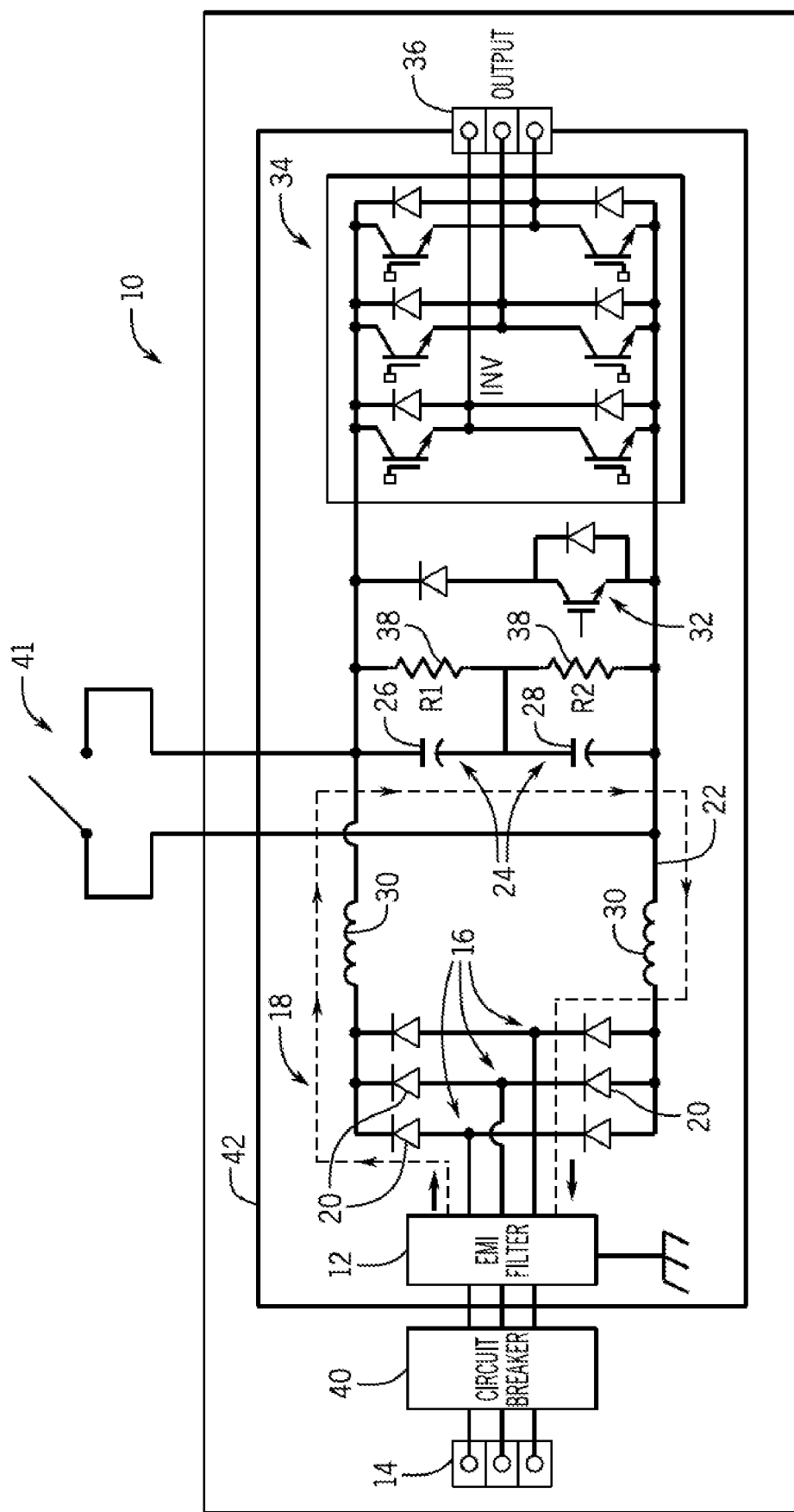
FIG. 1 is a schematic diagram of an ASD circuit and external circuit breaker, illustrated under a breakdown of components test configuration with the DC link shorted out, as known in the prior art.
Figure 2:
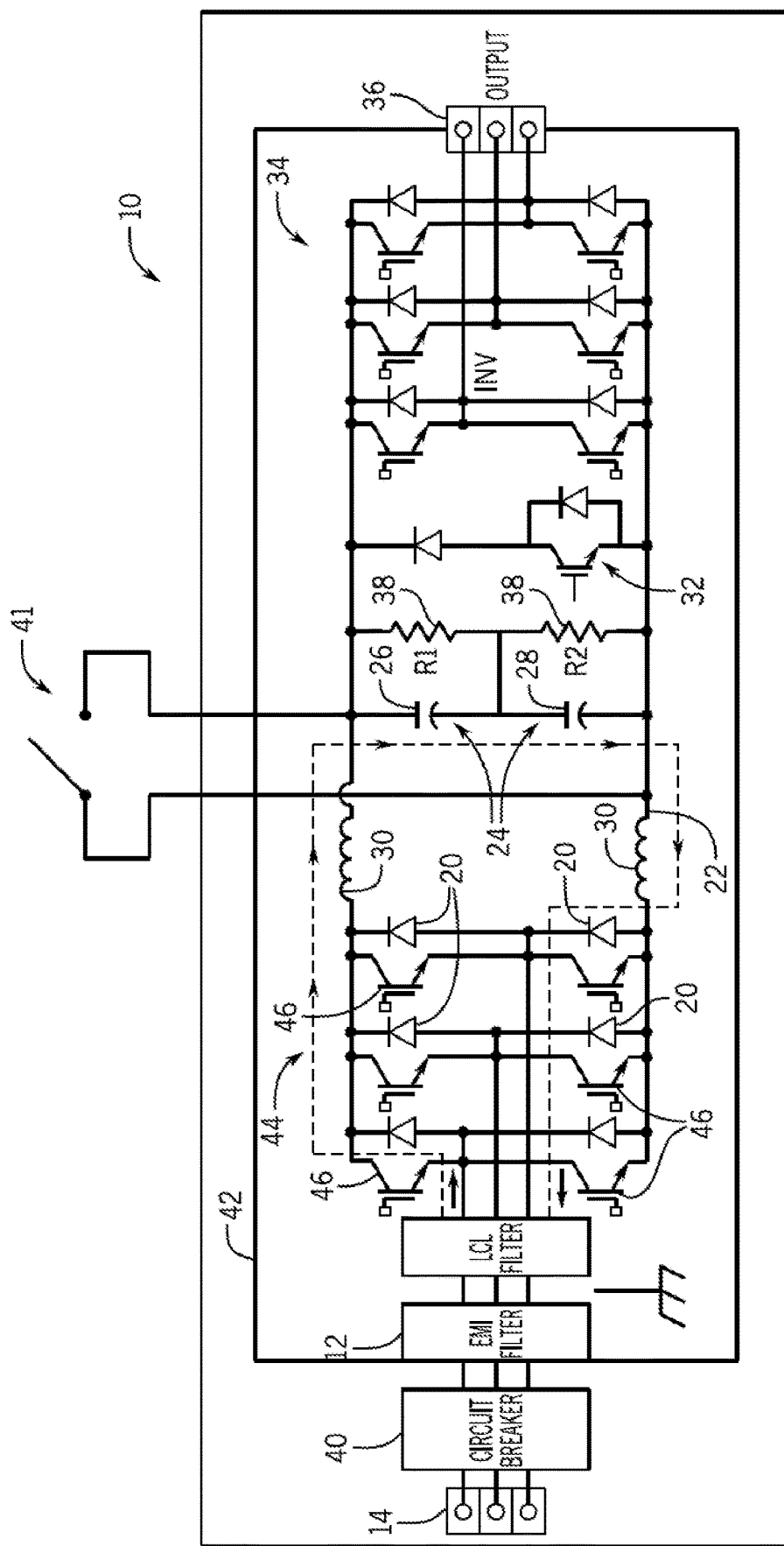
FIG. 2 is a schematic diagram of another ASD circuit, illustrated under a breakdown of components test configuration with the DC link shorted out, as known in the prior art.
Figure 3:
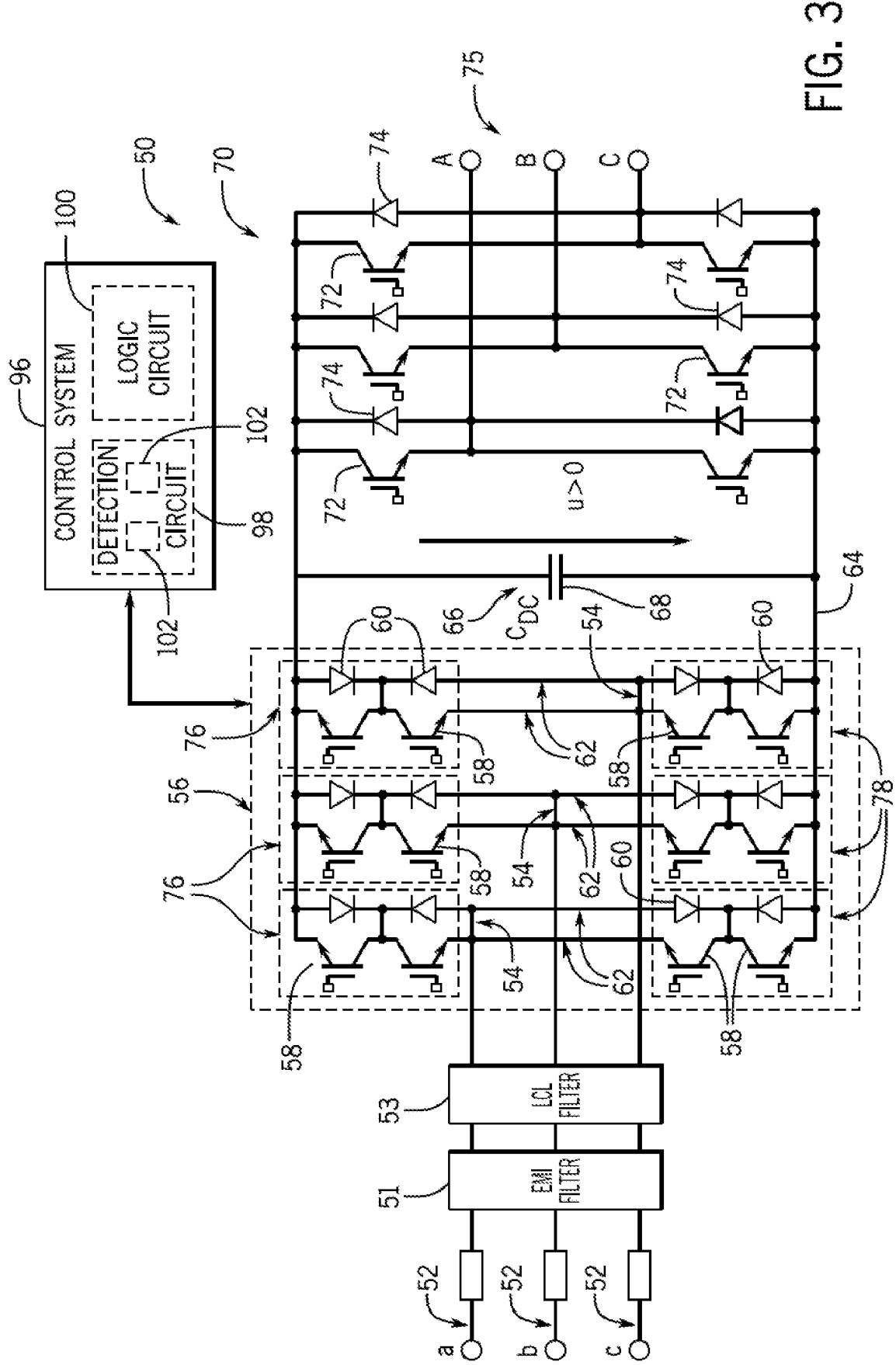
FIG. 3 is a schematic diagram of an ASD circuit with an integrated solid-state circuit breaker, according to an embodiment of the invention.

Referring to FIG. 3, an ASD or VFD circuit 50 with integrated solid-state circuit breaker is illustrated according to an exemplary embodiment of the invention. The ASD circuit 50 includes a drive input 52 and input rectifier terminals 54, with an EMI filter 51 and LCL filter 53 (optional, depending on circuit topologies) connected between the input 52 and terminals 54. The terminals are connected to a front-end AC-DC rectifier bridge or circuit 56 comprising an arrangement of solid-state switches 58 and diodes 60 provided on phase legs 62 of the bridge corresponding to each of the three input phases. The rectifier circuit 56 converts an AC input power provided at drive input 52 (such as, for example, from a utility grid) into a DC power and also functions as a solid-state circuit breaker to interrupt current flow through the ASD circuit 50, as will be explained in greater detail below.

ASD circuit 50 additionally includes a DC link or bus 64 that receives the DC power from rectifier circuit 56 and a DC link capacitor bank 66 comprised of one or more capacitors 68 across DC link 64 to provide smoothing to the DC link voltage, with this smoothed voltage then being provided to an inverter 70. While capacitor bank 66 is shown with one capacitor 68, capacitor bank 66 may include additional capacitors connected in series or parallel arrangements, as needed. While not shown in FIG. 3, it is recognized that inductors could be included in ASD circuit 50 coupled in series with and on either side of rectifier circuit 56, as well as a pre-charge circuit coupled in series with one of the inductors to control and limit inrush current into the DC link capacitor bank 66 during power up (when drive input 14 is initially coupled to an AC input power). Still further, a brake chopper may be included in ASD circuit 50 to discharge the DC link capacitor 68 in a controlled manner, with the voltage from the brake chopper then being provided to inverter 70 coupled to the DC link 64. The inverter 70 is composed of an arrangement of solid state switching devices 72 and anti-parallel diodes 74, that collectively form a PWM inverter that synthesizes AC voltage waveforms with a variable frequency and amplitude for delivery to output 75 of inverter 70, so as to provide a controlled three-phase power to a load driven thereby (e.g., AC motor).

As shown in the embodiment of FIG. 3, the rectifier circuit 56 is comprised of six switching units 76, 78 arranged on the three input phases 52, i.e., a pair of switching units in series on each phase—an upper switching unit 76 and a lower switching unit 78. Each of the switching units 76, 78 is formed of a pair of unidirectionally conducting solid-state semiconductor switches 58 and a pair of diodes 60. While the solid-state semiconductor switches 58 are shown as insulated-gate bipolar transistor (IGBTs) in FIG. 3, it is recognized that other solid-state semiconductor switches could be used instead, including metal oxide semiconductor field effect transistors (MOSFETs) or integrated gate-commutated thyristors (IGCTs), for example, although other solid-state semiconductor switches may also be suitable, and thus embodiments of the invention are not meant to be limited to the specific switch types set forth above. Furthermore, the switches 58 (and diodes 60) can be made with Silicon (Si), Silicon Carbide (SiC), Gallium Nitride (GaN), or any suitable Wide Bandgap (WBG) material, with exemplary embodiments having the switches made of GaN or SiC.

Figure 8A:
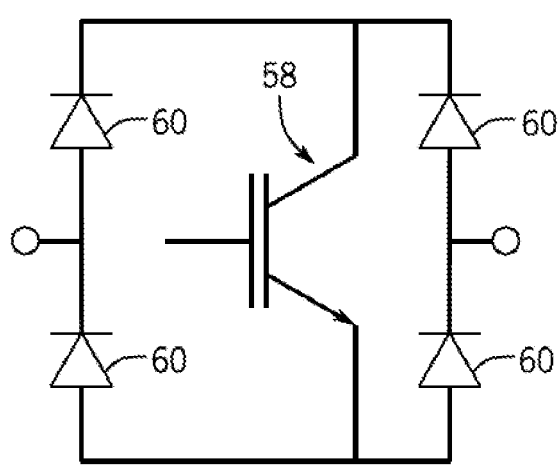
FIGS. 8A-8D are schematic diagrams of various solid-state switch and/or diode configurations and arrangements that may be implemented in the ASD circuit of FIG. 3, according to embodiments of the invention.
Figure 8B:
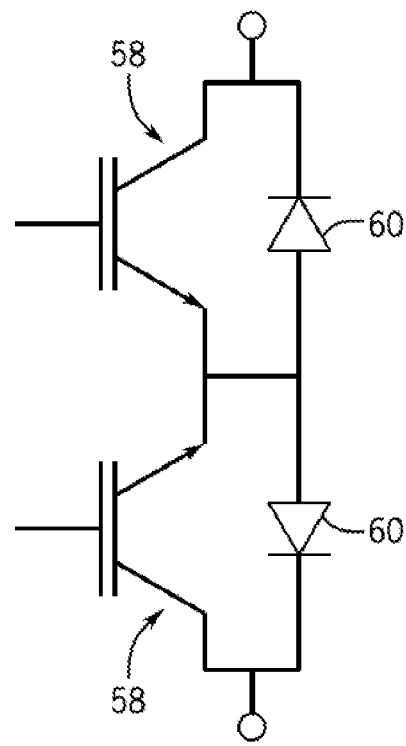
Figure 8C:
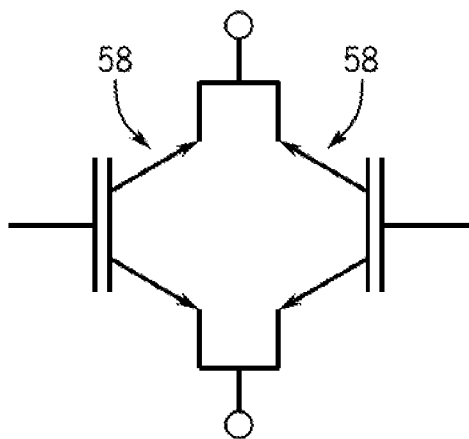
Figure 8D:
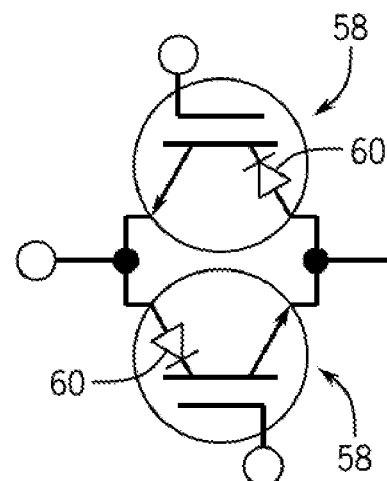

As shown in FIG. 3, each of the IGBTs 58 in a respective switching unit 76, 78 is arranged in anti-parallel with an associated diode 60. The IGBTs 58 in each switching unit 76, 78 are further arranged and connected with one another in anti-series in a common collector (CC) configuration—referred to hereafter simply as "reverse-blocking IGBTs." The diodes 60 are arranged in opposing directions (i.e., anti-series) relative to one another, so as to block current flow in differing directions through the rectifier circuit 56. Based on the arrangement of diodes 60 and reverse-blocking IGBTs 58, each switching unit 76, 78 thus provides a bi-directional switching unit that is able to control current and withstand voltage in both directions and allow for the selective interruption of current flow within ASD circuit 50. With regard to the switching units 76, 78 illustrated in FIG. 3, it is noted that while the IGBTs 58 (and diodes 60) are shown therein as being connected in anti-series in a common collector configuration, the IGBTs 58 and diodes 60 could instead be connected in other configurations while still providing the desired current controls and voltage protection. FIGS. 8A-8D illustrate alternate IGBT and diode arrangements/configurations that could be used as alternatives to the common collector configuration shown in FIG. 3. FIG. 8A shows a diode bridge configuration where a single IGBT 58 is arranged with four diodes 60. FIG. 8B shows IGBTs 58 connected in anti-series in a common emitter (CE) configuration, while still functioning as reverse-blocking IGBTs (with the orientation of each of diodes 60 then being flipped) able to control current and withstand voltage in both directions and allow for the selective interruption of current flow within ASD circuit 50. FIG. 8C shows two IGBTs 58 arranged/connected in anti-parallel as a reverse blocking (RB) IGBT. Each of the above IGBT and diode arrangements provides distinct advantages and disadvantages, and thus the exact construction of each switching unit 76, 78 can be determined based on the implementation of ASD circuit and the needs/requirements thereof. FIG. 8D illustrates another reverse blocking (RB) IGBT arrangement where each IGBT 58 and diode are integrated in one die, with two such dies being connected as shown to control current and withstand voltage in both directions and allow for the selective interruption of current flow within ASD circuit 50.

Figure 4A:
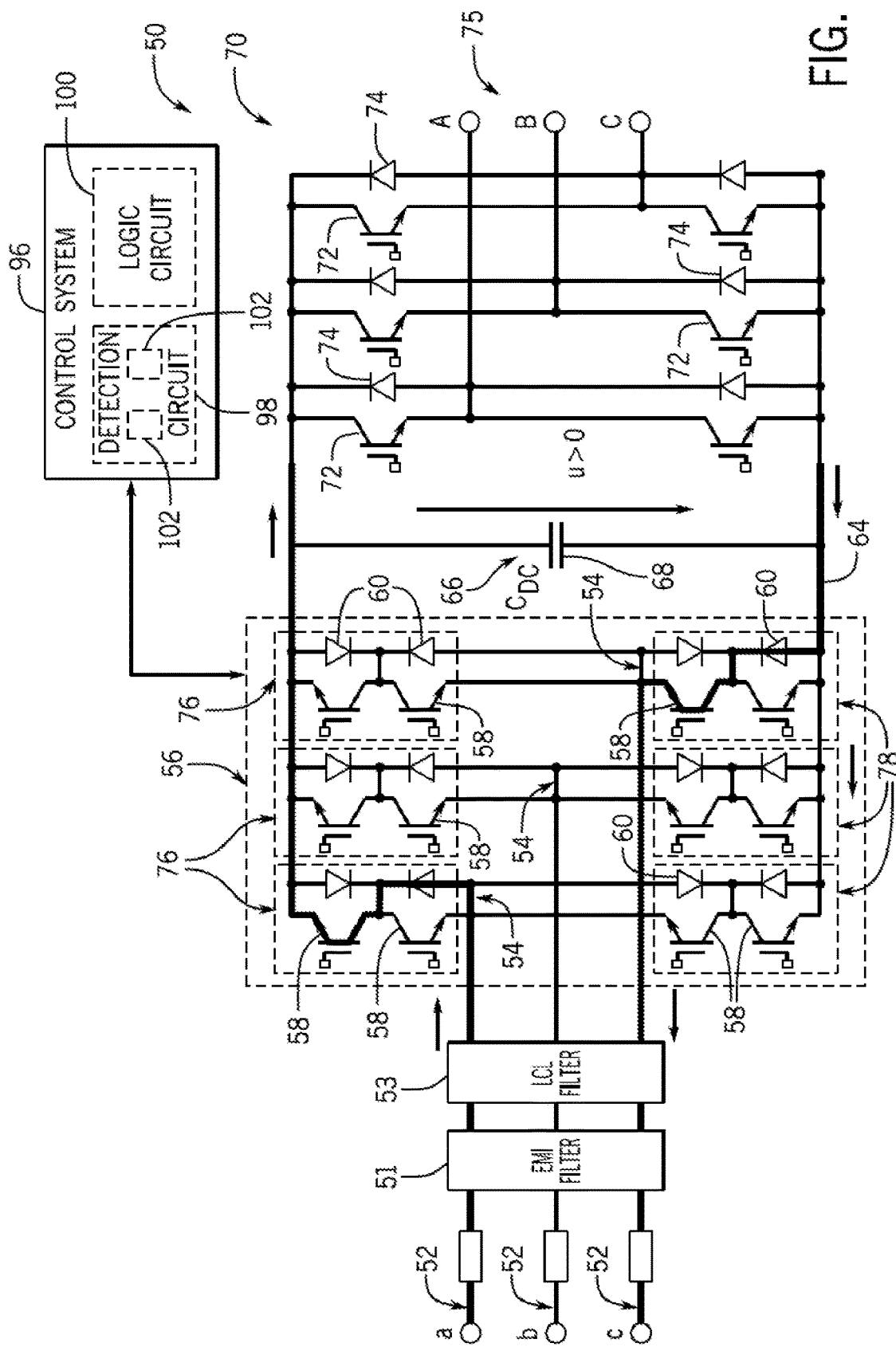
FIGS. 4A and 4B are schematic diagrams illustrating current flow paths through the ASD circuit of FIG. 3 during normal operation and a fault condition (illustrated in one of the three phases), respectively, based on selective operation of the integrated solid-state circuit breaker, according to embodiments of the invention.
Figure 4B:
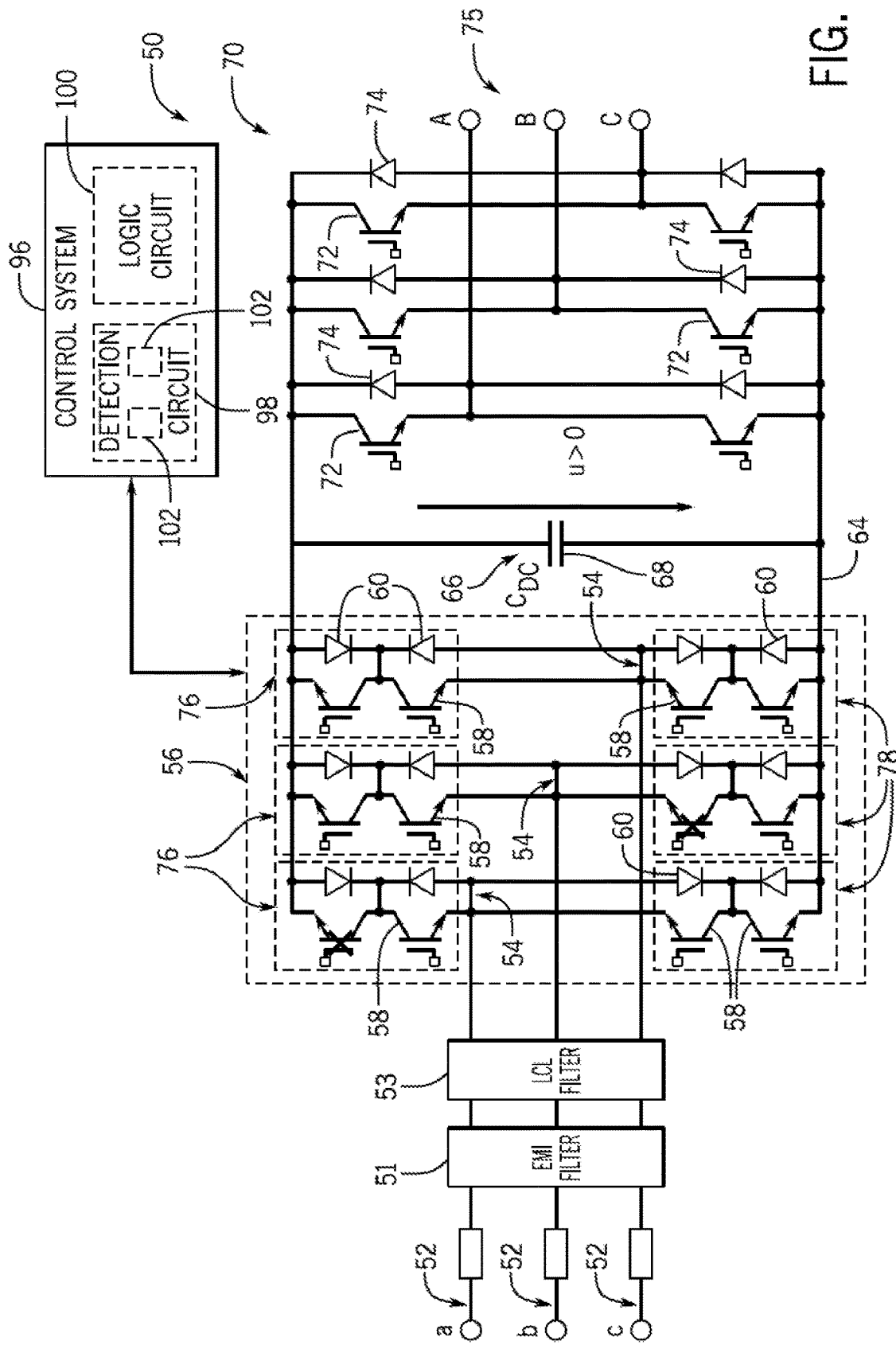

Referring now to FIGS. 4A and 4B, the selective allowance and interruption of current flow along one phase 52 of the ASD circuit 50 based on functioning of rectifier circuit 56 is shown for purposes of illustration/explanation. First, as illustrated in FIG. 4A, under normal operating conditions of ASD circuit 50, current flow is provided along input 52 from an AC power source and passes through diode 60 of an upper switching unit 76 in an uncontrolled fashion. Under normal operating conditions of ASD circuit 50, IGBT 58 of upper switching unit 76 is in an On or conducting state, and thus current also passes through IGBT 58 and to DC capacitor bank 66 connected across DC link 64. Current then flows back through diode 60 of lower switching unit 78, again in an uncontrolled fashion, with current then continuing to flow through IGBT 58 of lower switching unit 78 when in an On or conducting state.

Next, as illustrated in FIG. 4B, under a fault condition such as shorting out of the +/−DC link 64 or other fault condition, current flow is provided along input 52 from an AC power source and passes through diode 60 of upper switching unit 76 in an uncontrolled fashion. Under a fault condition, IGBT 58 of upper switching unit 76 is caused to operate in an Off or non-conducting state (as indicated by the "X" marking in FIG. 4B), with switching of the IGBT 58 to the Off or non-conducting state being responsive to any of a number of sensed faults or parameters associated with the ASD circuit 50, as will be explained in greater detail below. Upon switching of IGBT 58 of upper switching unit 76 to the Off or non-conducting state, current flow is blocked by IGBT 58 and current flow to the DC link 64 and capacitor bank 66 is terminated. According to one embodiment, and as shown in FIG. 4B, IGBT 58 of lower switching unit 78 is also caused to operate in the Off or non-conducting state, thus providing a redundant blocking of current flow in ASD circuit 50.

While not shown in FIGS. 4A and 4B, it is to be understood that controlling of IGBTs 58 in switching units 76, 78 on the other phases 52 would be performed in similar fashion to selectively allow and interrupt current flow on the other phases in the ASD circuit 50 during normal operating and fault conditions therein.

In addition to functioning as a solid-state circuit breaker and providing protection to ASD circuit, it is recognized that rectifier bridge 56 also provides flexibility regarding operation thereof as either an active front end rectifier bridge or an uncontrolled diode front end rectifier bridge. That is, it is recognized that IGBTs 58 of rectifier bridge 56 may be selectively controlled so as to provide active or passive rectification in ASD circuit 50. In operation as an uncontrolled diode front end rectifier bridge, IGBTs 58 may be left gated On during normal operation of the ASD circuit 50, such that current flows through IGBTs (and diodes 60) in an uncontrolled manner. In operation as an active front end rectifier bridge, IGBTs 58 may be selectively gated On and Off during normal operation of the ASD circuit 50, such that current flows through IGBTs 58 in a controlled manner. The operation of rectification circuit 56 in an active or passive/uncontrolled fashion (based on operation of IGBTs 58) can be determined based on the implementation of ASD circuit and the needs/requirements thereof, and appropriate associated components would be included in the circuit if operated as an active front end rectifier—LCL filter 53 (FIG. 3) would be included in the ASD circuit 50 for an active rectifier circuit, but is not required in an uncontrolled front end rectifier configuration.

Figure 5:
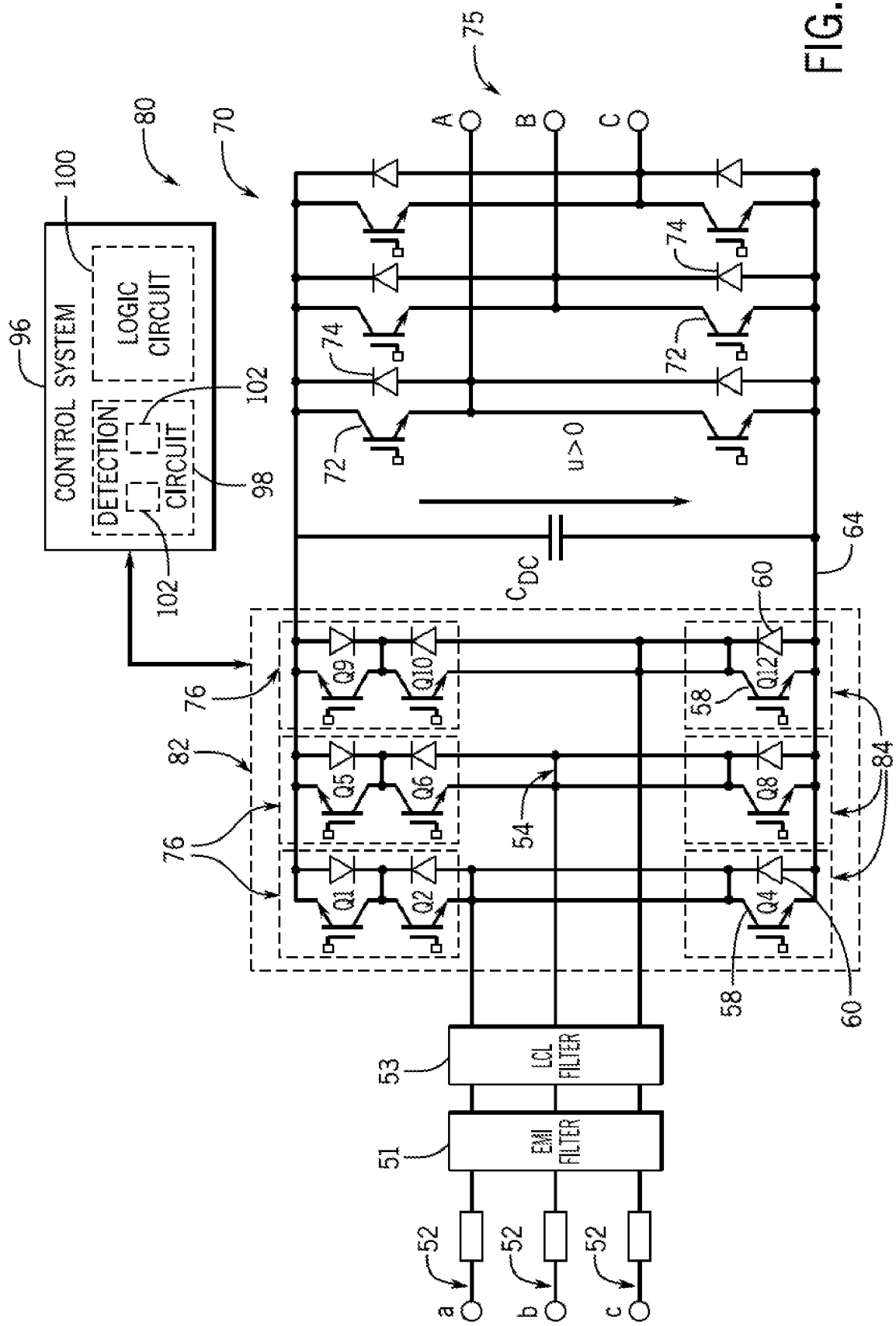
FIG. 5 is a schematic diagram of an ASD circuit with an integrated solid-state circuit breaker, according to another embodiment of the invention.

Referring now to FIGS. 5 and 6, additional ASD circuits are illustrated according to other embodiments of the invention. As first shown in FIG. 5, an ASD circuit 80 is provided that includes an AC-DC rectifier circuit 82 that is modified as compared to the AC-DC rectifier circuit 56 of FIG. 3. That is, each of a number of upper switching units 76 in rectifier circuit 82 have an identical construction to the switching units 76 shown and described previously in FIG. 3—with each upper switching unit 76 including a pair of IGBTs 58 arranged in anti-parallel with an associated diode 60, and with the IGBTs 58 arranged such that they function as reverse-blocking IGBTs 58 in the switching unit 76 and the diodes 60 also being arranged in opposing directions, so as to block current flow in differing directions through the rectifier circuit. However, the lower switching units 84 in rectifier circuit 56 are modified as compared to the upper switching units 76, with each of the lower switching units 84 including only a single IGBT 58 arranged in anti-parallel with an associated diode 60 (i.e., no reverse-blocking IGBT and associated blocking diode).

With regard to the ASD circuit 80 of FIG. 5, it is recognized that lower switching units 84 may have a simpler construction (i.e., removal of reverse-blocking IGBT and associated blocking diode) as compared to upper switching units 76, as the lower switching units 84 provide only a redundant blocking of current flow in ASD circuit 80. That is, the controlling of IGBTs 58 in each of upper switching units 76 should be sufficient to block current flow current flow through the switching units 76 and prevent current from continuing to flow to the DC link capacitor bank 66, so as to provide protection thereto. The ASD circuit 80 may be provided at a lower cost as compared to ASD circuit 50 of FIG. 3, while still providing adequate protection to the ASD drive 80. Additionally, because of device number reduction, the system losses are decreased with efficiency gains.

Figure 6A:
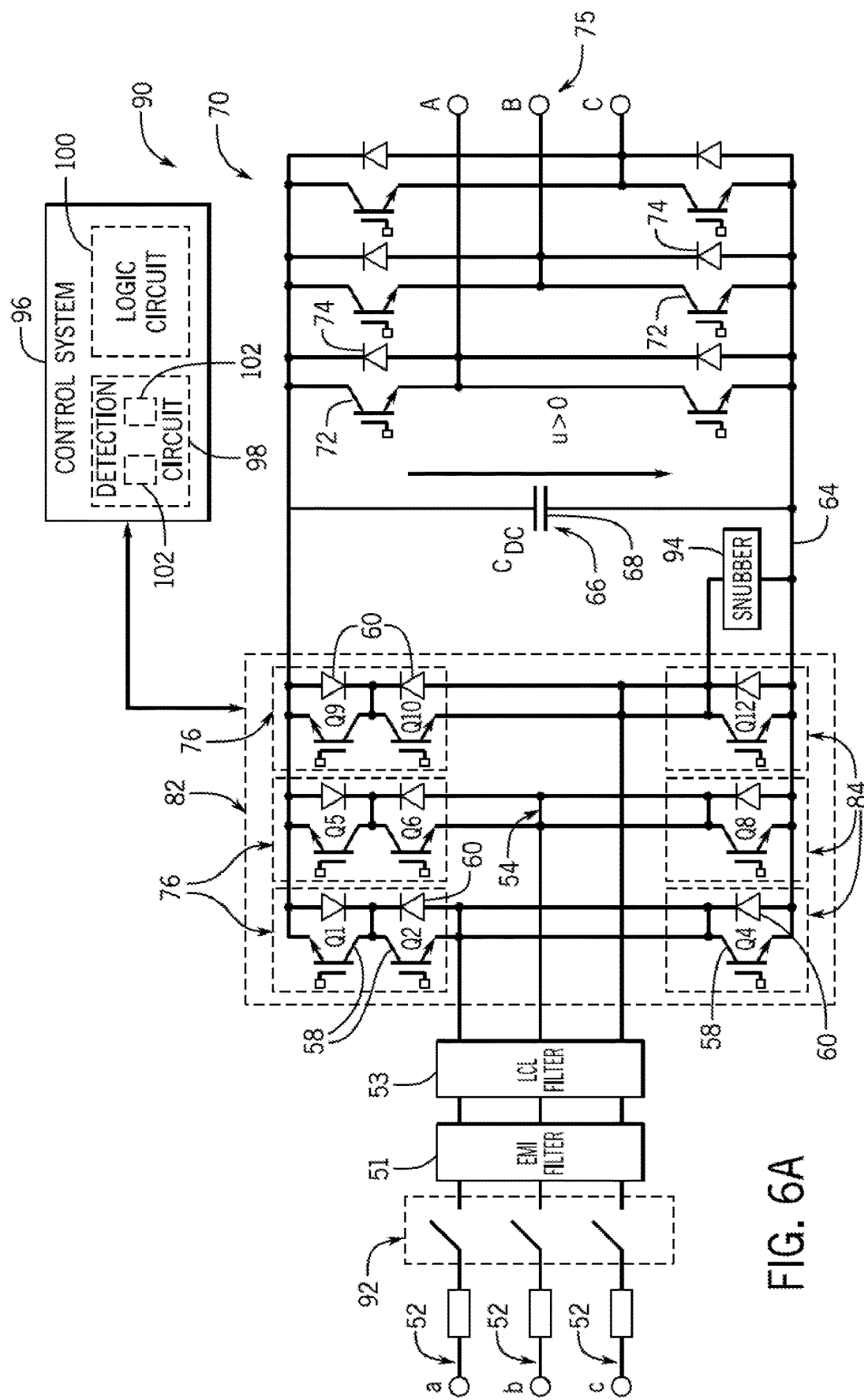
FIG. 6A is a schematic diagram of an ASD circuit with an integrated solid-state circuit breaker, according to another embodiment of the invention.
Figure 6B:
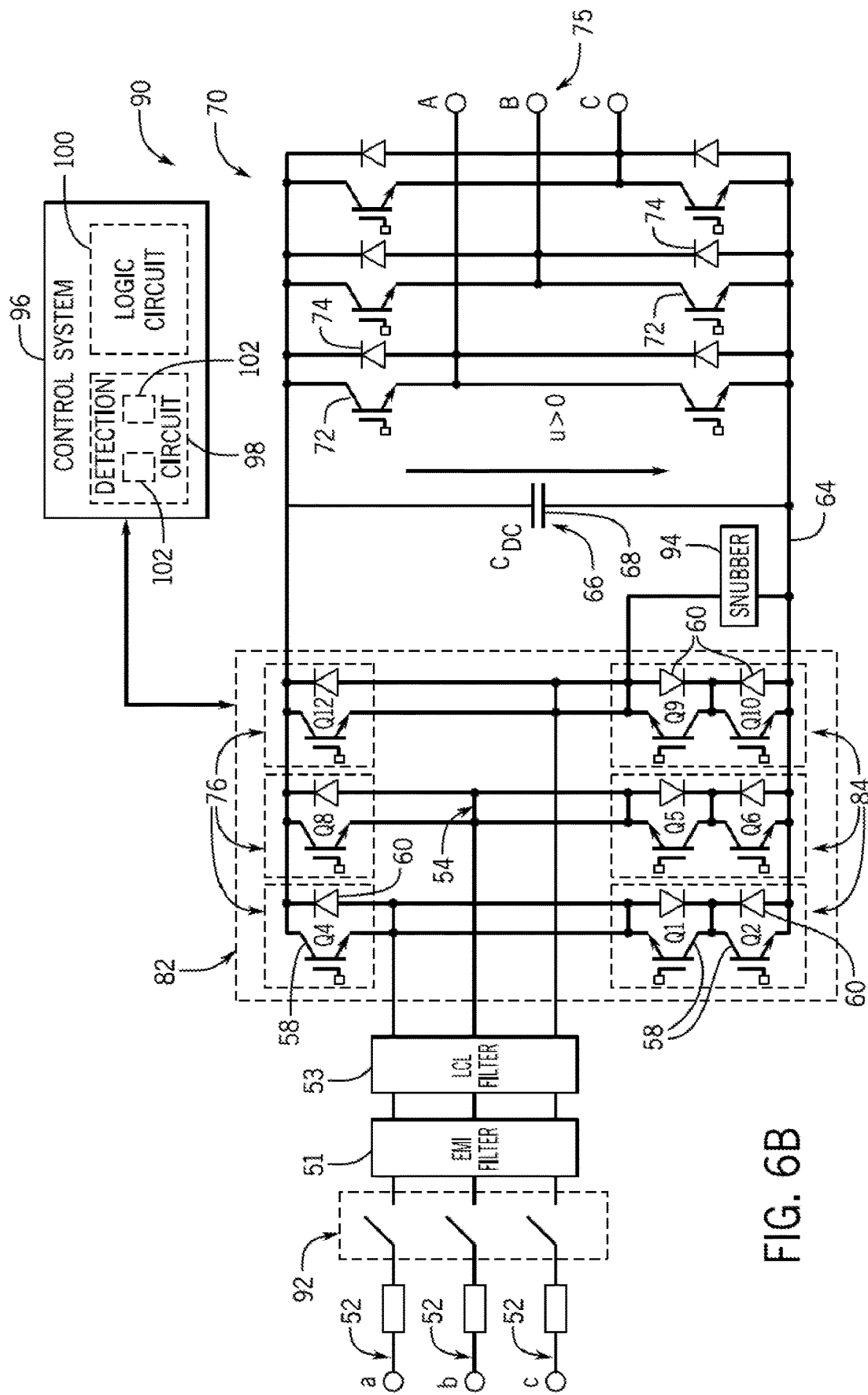
FIG. 6B is a schematic diagram of an ASD circuit with an integrated solid-state circuit breaker, according to another embodiment of the invention.

As shown in FIGS. 6A and 6B, an ASD circuit 90 is provided that includes additional protection devices therein as compared to the ASD circuits 50, 80 of FIGS. 3 and 5. In the embodiment illustrated embodiment of FIGS. 6A and 6B, the additional protection devices include a galvanic isolation disconnect switch 92 and a snubber circuit 94, although it is recognized that just one of these two devices could be included in ASD circuit 90. The disconnect switch 92 is located between the drive input 52 and input rectifier terminals 54 and may provide additional protection to the circuit, with the inclusion of disconnect switch 92 allowing the circuit 90 to meet the UL 489 standard, thereby enabling use of the circuit in service entrance, feeder, branch circuit, and other building applications, for example. The disconnect switch 92 functions when all solid-state semiconductor devices in ASD circuit 90 are in their Off or non-conducting state. The snubber circuit 94 is connected to rectifier circuit 82 and functions to absorb transients in the ASD circuit 90, as well as provide electromagnetic interference filtering in the ASD circuit 90.

While the rectifier circuit 82 of ASD circuit 90 is shown in FIG. 6A as having an identical AC-DC rectifier circuit construction to that of the AC-DC rectifier circuit 82 in the ASD circuit of FIG. 5, it is recognized that protection devices could be added to ASD circuits having various rectifier circuit constructions. In the embodiment of FIG. 6A, each upper switching unit 76 includes a pair of IGBTs 58 arranged in anti-parallel with an associated diode 60, and with the IGBTs 58 arranged such that they function as reverse-blocking IGBTs in the switching unit 76 and the diodes 60 also being arranged in opposing directions, so as to block current flow in differing directions through the rectifier circuit 82, while each lower switching unit 84 includes only a single IGBT 58 arranged in anti-parallel with an associated diode 60. However, the construction of upper and lower switching units 76, 84 could be reversed, as shown in FIG. 6B, with the upper switching units 76 having a simplified construction of only a single IGBT 58 arranged in anti-parallel with an associated diode 60 and the lower switching units 84 including multiple IGBTs 58 and diodes 60 arranged that function as reverse-blocking IGBTs and diodes. Still further, the construction of rectifier circuit 82 could be modified so as to be identical to that of rectifier circuit 56 of FIG. 3.

Referring now collectively to FIGS. 3 and 5-7, it is seen that each of the ASD circuits 50, 80, 90 illustrated therein further includes a control system 96 that functions to control On/Off switching of the IGBTs 58 of a rectifier circuit. As referred to herein, the control system 96 is defined as including a detection circuit 98 and a logic circuit 100 in operative communication with one another—i.e., the logic circuit 100 receives in input signals from the detection circuit 98. The detection circuit 98 operates to measure or determine voltage or current measurements in ASD circuit 50, 80, 90, while the logic circuit 100 operates to sense a short circuit or other fault condition in the ASD circuit 50, 80, 90 and control switching of the IGBTs 58 of rectifier circuit 56, 82 during normal operation of the ASD circuit and upon detection of a fault condition in the ASD circuit. While each of detection circuit 98 and logic circuit 100 is shown as a single circuit in FIGS. 3, 5, and 6, it is recognized that each of the circuits may in fact comprise a number of separate and distinct controllers or processors, and that embodiments of the invention are not meant to be limited in such regard. For example, separate logic circuits may be provided for sensing a short circuit or other fault condition in the ASD circuit 50, 80, 90 and controlling switching of the IGBTs 58 of rectifier circuit 56, 82. Still further, while control system 96 is shown as being part of ASD circuit 50, 80, 90, it is recognized that the control system 96—i.e., one or both of the detection circuit 98 and logic circuit 100 thereof—could instead be provided as separate from ASD circuit 50, 80, 90 but operably connected thereto.

As shown in the figures, detection circuit 98 may include one or more voltage or current sampling or sensing circuits or sensors 102 configured to measure or determine voltage and/or current at one or more locations in the ASD circuit 50, 80, 90. Thus, while shown as being incorporated in detection circuit 98, it is recognized that sampling or sensing circuits 102 could be dispersed throughout ASD circuit 50, 80, 90. According to embodiments of the invention, the detection circuit 98 may operate to measure one or more of the following voltage/current parameters in the ASD circuit 50, 80, 90, including: three phase input currents or voltages, current at the switch level of rectifier circuit, DC link current, and/or load output currents or voltages, for example. A number of examples of exemplary operation of the detection circuit will be set forth here below, according to embodiments of the invention, along with the operation of logic circuit 100 tied to detection circuit 98.

In a first example of operation of detection circuit 98, detection circuit 98 may include a voltage sampling circuit 102 (i.e., voltage sensors) positioned on capacitor 68 to measure the voltage thereacross. While not shown, it is recognized that an additional capacitor 68 could be included in capacitor bank 66 and have an additional voltage sampling circuit 102 thereon so that the voltage across the additional capacitor may be measured as well. In detecting a short circuit in capacitor bank 66, logic circuit 100 compares the voltage across capacitor 68 received from voltage sampling circuit 102 to a voltage threshold or limit such as, for example, an overvoltage threshold or an undervoltage threshold. If the voltage across capacitor 68 crosses or passes the voltage threshold, logic circuit 100 detects a shorted capacitor in capacitor bank 66. In some embodiments, logic circuit 100 compares the voltage across capacitor 68 to both an overvoltage voltage threshold and an undervoltage threshold. The overvoltage and undervoltage thresholds may be set approximately 50-100 volts (V) from a nominal capacitor bank voltage and a short circuit voltage, respectively. For example, in an embodiment where capacitor bank 66 includes two capacitors 68, if the nominal voltage across capacitor bank 66 is 650V, both capacitors 68 should have 325V thereacross. If a first capacitor is shorted, then the entire 650V drop would be across the second capacitor, and the overvoltage threshold could be set to about 550-600V, while the voltage then across the first capacitor would drop to 0V, and the undervoltage threshold could be set to about 50-100V. In another embodiment, the voltage across both capacitors 68 may be measured by voltage sampling circuit 102, with the logic circuit 100 calculating the difference between the voltage across the capacitors and comparing that difference to a voltage threshold.

In operation, if the voltage across capacitor 68 crosses or passes the voltage threshold (or if a difference between the voltage across multiple capacitors 68 is greater than a voltage threshold), logic circuit 100 detects a shorted capacitor in capacitor bank 66 and thus identifies a fault condition in ASD circuit 50, 80, 90. Upon such detection/identification, logic circuit 100 then functions to implement a circuit breaking operation via selective switching of IGBTs 58 in the rectifier circuit 56, 82 of ASD circuit 50, 80, 90, with the logic circuit 100 being operably connected to the IGBTs 58 of rectifier circuit 56, 82 to control switching thereof. When the logic circuit 100 detects a shorted capacitor, the logic circuit 100 transmits gating signals to selective IGBTs 58 in the rectifier circuit 56, 82, such as the IGBTs 58 as illustrated in FIG. 4B, so as to cause the two IGBTs 58 to turn off and become non-conductive—thereby terminating current flow therethrough and preventing additional current from flowing through capacitor bank 66. Similar gating signals would be transmitted to selective IGBTs 58 in each of the other switching units 76, 78 by logic circuit 100 to control current flow on other phase legs 62 of the rectifier circuit 56, 82.

In a second example of operation of detection circuit 98, detection circuit 98 functions to sense a current across at the switch level of rectifier circuit, i.e., current across IGBTs 58 in rectifier circuit 56, 82. In one embodiment, the detection circuit 98 may include a voltage sampling or sensing circuit 102 that senses the emitter/source voltage of each IGBT 58 in rectifier circuit 56, 82. For each IGBT 58, the detection circuit 98 may then, after a temperature compensation step being performed, calculate the conduction current across the IGBT 58 based on the voltage. In another embodiment, the detection circuit 98 may include a current sampling or sensing circuit 102 that directly senses the conduction current across each IGBT 58 in rectifier circuit 56, 82. In either embodiment, the calculated/measured current value may then be compared to a pre-determined current threshold by logic circuit 100, and logic circuit 100 will detect a fault condition in ASD circuit 50, 80, 90 if the current value is above the threshold value. Upon such detection/identification, logic circuit 100 then functions to implement a circuit breaking operation via the selective switching of IGBTs 58 in the rectifier circuit 56, 82, with the logic circuit 100 transmitting gating signals to selective IGBTs 58 in the rectifier circuit 56, 82, such as the IGBTs 58 as illustrated in FIG. 4B, so as to cause the two IGBTs 58 to turn off and become non-conductive—thereby interrupting current flow therethrough and terminating current flow through rectifier circuit 56, 82. Similar gating signals would be transmitted to selective IGBTs 58 in each of the other switching units 76, 78 by logic circuit 100 to control current flow on other phase legs 62 of the rectifier circuit 56, 82.

In another example of operation of detection circuit 98, detection circuit 98 functions to sense a current and/or voltage on each of the three input phases 52 to ASD circuit 50, 80, 90. The detection circuit 98 may thus include a current/voltage sampling or sensing circuit 102 that senses the current and/or voltage on each phase 52. The three-phase current/voltage measured by detection circuit 98 may then be compared to one or more respective current/voltage thresholds by logic circuit 100 to detect the presence of a fault. In one embodiment, the three-phase current is compared to the input current rating of the ASD circuit 50, 80, 90 to see if any of the phase currents exceeds a maximum rated current value. In another embodiment, the voltage imbalance of the three phase supply may be compared to a pre-determined imbalance threshold. In either embodiment, logic circuit 100 may detect a fault condition in ASD circuit 50, 80, 90 if the current/voltage value is above the threshold value. Upon such detection/identification, logic circuit 100 then functions to implement a circuit breaking operation via the selective switching of IGBTs 58 in the rectifier circuit 56, 82, with the logic circuit 100 transmitting gating signals to selective IGBTs 58 in the rectifier circuit 56, 82, such as the IGBTs 58 as illustrated in FIG. 4B, so as to cause the two IGBTs 58 to turn off and become non-conductive—thereby interrupting current flow therethrough and terminating current flow through rectifier circuit 56, 82. Similar gating signals would be transmitted to selective IGBTs 58 in each of the other switching units 76, 78, by logic circuit 100 to control current flow on other phase legs of the rectifier circuit 56, 82.

Figure 7:
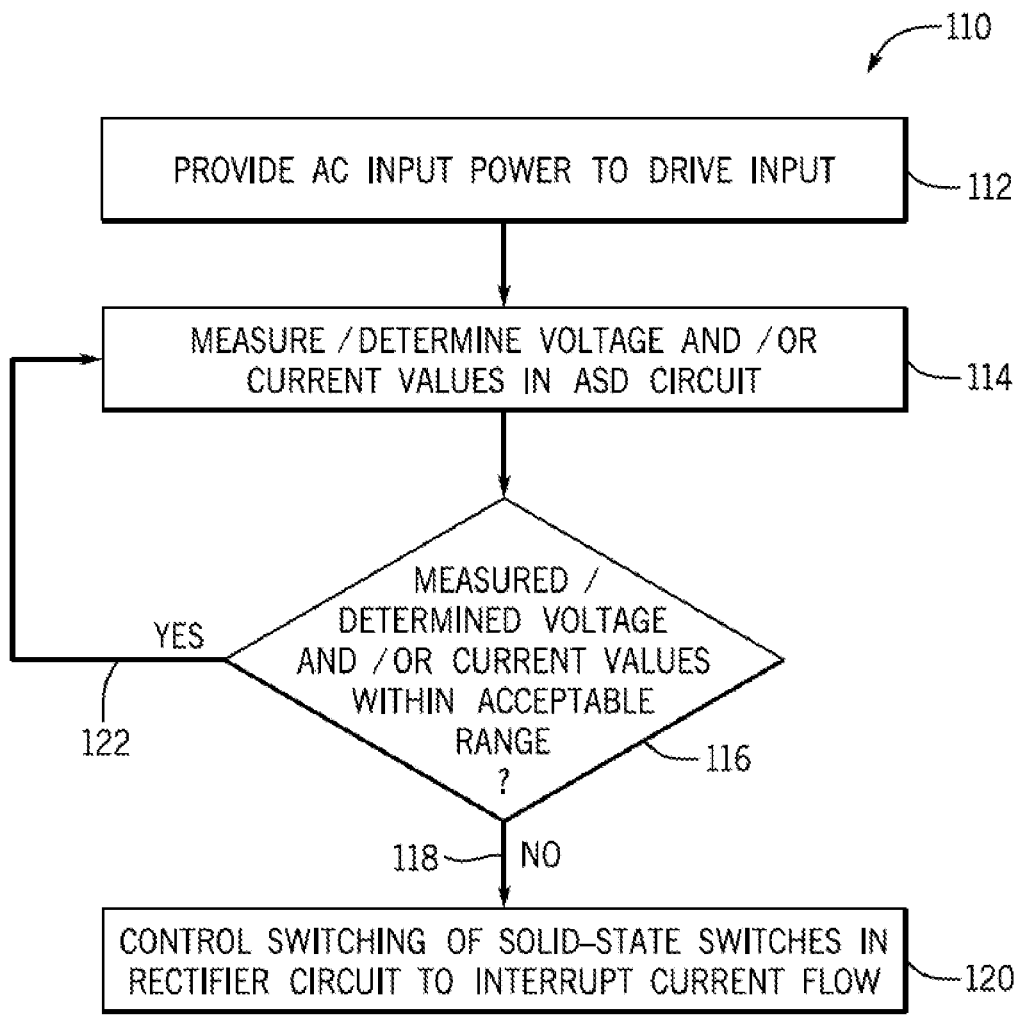
FIG. 7 is a flowchart illustrating a technique for controlling the ASD circuit of FIG. 3, according to an embodiment of the invention.

Referring now to FIG. 7, and with reference back to FIG. 3, a technique 110 for controlling ASD circuit 50 is shown, with the technique being performed by the detection circuit 98 and logic circuit 100 of ASD circuit 50, as described above. Process 110 starts at STEP 112 when an AC input power is applied at drive input 52 of ASD circuit 50. The providing of AC input power at STEP 112 may be performed as part of a normal operation of ASD circuit 50 or may be as part of a breakdown of components testing of ASD circuit 50.

Upon a supplying of AC input power at drive input 50, one or more measured/determined voltage and/or current values are acquired via detection circuit 98 at STEP 114. As previously described, voltage/current parameters that may be measured or determined in the ASD circuit 50, including: three phase input currents or voltages, current at the switch level of rectifier circuit, DC link current, and/or DC link capacitor current, for example. Upon acquisition of such values, a determination is made at STEP 116 regarding whether the one or more measured/determined voltage and/or current values within the ASD circuit 50 are normal and within an acceptable range—with such determination being made via detection circuit 98 and/or logic circuit 100. The determination at STEP 116 is either based on whether any measured voltage/current has exceeded a pre-determined limit/threshold or based on whether a difference between respective voltage/current measurements has exceeded a limit/threshold, as defined in logic circuit 100. If it is determined at STEP 116 that any of the voltage/current parameters are abnormal, as indicated at 118, logic circuit 100 operates to control switching of solid-state switches 58 in the rectifier circuit 56 in a manner that causes the rectifier circuit 56 to operate as a solid-state circuit breaker and interrupt current flow through ASD circuit 50 at STEP 120. That is, at STEP 120, logic circuit 100 functions to implement a circuit breaking operation via the selective switching of IGBTs 58 in the rectifier circuit 56, with the logic circuit 100 transmitting gating signals to selective IGBTs 58 in the rectifier circuit 56, such as the IGBTs 58 as illustrated in FIG. 4B, so as to cause the two IGBTs 58 to turn off and become non-conductive—thereby interrupting current flow through ASD circuit 50. Similar gating signals would be transmitted to selective IGBTs 58 in each of the other switching units 76, 78 by logic circuit 100 to control current flow on other phase legs 62 of the rectifier circuit 56. As one example of protection provided by switching of IGBTs 58, interruption of the current flow prevents additional current from passing through DC link capacitor 68, thereby eliminating the risk of the capacitor 68 exploding or starting on fire due to an uncontrolled overvoltage therethrough.

Referring still to FIG. 7, if detection circuit 98 instead determines at STEP 116 that all of the measured voltage/current parameters are normal, as indicated at 122, it is then considered that ASD circuit 50 is operating in a normal state/condition (and that input voltages/currents are acceptable), and that ASD circuit 50 may thus be safely operated. Accordingly, technique 110 returns to STEP 114 and continues to monitor the aforementioned voltage/current parameters for identification of any future fault.

Beneficially, embodiments of the invention thus provide a power conversion circuit, such as an ASD circuit, having circuit breaker capability and functionality built-in thereto to protection against short circuits and other fault conditions that might be present in the power conversion circuit. The incorporation of a solid-state circuit breaker into the power conversion circuit thus provides an effective solution to limit damage to the power conversion circuit from a capacitor short or other fault condition, with the protection circuit allowing for the power conversion circuit to meet the requirements of the UL61800-5-1 breakdown of components test.

The ASD circuit and integrated solid-state circuit breaker removes the need for installing an external circuit breaker, achieving system flexibility, providing increased protection (via improved response/switching time—e.g., in the order of microseconds vs. milliseconds with a traditional external circuit breaker), and reducing total cost of ownership. The integrated solid-state circuit breaker also provides protection during both steady state operation of the power conversion circuit and during transient operation of the power conversion circuit. Still further, the structure of the front end rectifier circuit and its integrated solid-state circuit breaker is such that the front end rectifier bridge is selectively operable as an active front end rectifier bridge or an uncontrolled diode front end rectifier bridge.

Therefore, according to one embodiment of the present invention a power conversion circuit includes an input connectable to an AC source, a rectifier circuit connected to the input to convert an AC power input to a DC power, and a DC link coupled to the rectifier circuit to receive the DC power therefrom. The rectifier circuit comprises a plurality of phase legs each including thereon an upper switching unit and a lower switching unit, wherein at least one of the upper and lower switching units on each phase leg comprises a bi-directional switching unit that selectively controls current and withstands voltage in both directions, so as to provide a circuit breaking capability that selectively interrupts current flow through the rectifier circuit.

According to another embodiment of the present invention, a method of providing circuit breaking in a power conversion circuit includes receiving an AC power at an input of the power conversion circuit and measuring or determining, via a detection circuit and logic circuit of the power conversion circuit, one or more current and voltage parameters of power provided to the power conversion circuit or present in the power conversion circuit. The method also includes comparing, via the detection circuit or logic circuit, the one or more current and voltage parameters to one or more respective current and voltage thresholds, and identifying, via the logic circuit, a fault condition in the power conversion circuit if the one or more measured or determined current and voltage parameters exceed the one or more respective current and voltage thresholds. The method further includes controlling, via the logic circuit, a solid-state circuit breaker integrated into the power conversion circuit to interrupt current flow through the power conversion circuit upon identification of the fault condition.

According to yet another embodiment of the present invention, an ASD circuit includes an input connectable to an AC source, a rectifier bridge with integrated solid-state circuit breaker connected to the input to convert an AC power input to a DC power, and a DC link coupled to the rectifier bridge to receive a DC link voltage therefrom. The rectifier bridge with integrated solid-state circuit breaker comprises a plurality of phase legs each including thereon an upper switching unit and a lower switching unit, wherein at least one of the upper and lower switching units on each phase leg is configured to control current and withstand voltage in both directions and allow for the selective interruption of current flow through the respective switching unit.

The present invention has been described in terms of the preferred embodiment, and it is recognized that equivalents, alternatives, and modifications, aside from those expressly stated, are possible and within the scope of the appending claims.

What is claimed is:

1. An apparatus comprising:
 a DC link comprising one or more capacitors;
 a rectifier circuit connected to the DC link, the rectifier circuit comprising controllable solid-state switching units; and
 a control system coupled to the rectifier circuit, the control system comprising:
  a detection circuit configured to sense one or more electrical properties; and
  logic configured to determine whether a fault condition exists based on an indication of the sensed one or more electrical properties, wherein the control system is configured to control one or more of the controllable solid-state switching units to terminate current flow to the DC link in response to determining that a fault condition exists.

2. The apparatus of claim 1, wherein the rectifier circuit and the DC link are implemented in one of an adjustable speed drive, a variable speed drive, a power conversion circuit, and an uninterruptible power supply.

3. The apparatus of claim 1, wherein the detection circuit comprises a sensor configured to sense the one or more electrical properties and to produce the indication, and the logic is configured to compare the indication to a pre-defined specification to determine whether a fault condition exists.

4. The apparatus of claim 3, wherein the sensor comprises a voltage sensor configured to measure a voltage across the DC link.

5. The apparatus of claim 3, wherein the sensor comprises a current sensor configured to measure a current in one of the controllable solid-state switching units.

6. The apparatus of claim 1, wherein each solid-state switching unit is configured to withstand voltage in a first direction and a second direction.

7. The apparatus of claim 6, wherein each solid-state switching unit comprises a first switching unit configured to terminate current that flows in the first direction, and a second switching unit configured to terminal current that flows in the second direction.

8. The apparatus of claim 7, wherein each first switching unit comprises two transistors, and each second switching unit comprises two transistors.

9. The apparatus of claim 7, wherein each first switching unit comprises more transistors than any second switching unit.

10. The apparatus of claim 1, wherein each solid-state switching unit is associated with one phase.

11. A system comprising:
 an input configured for connection to an alternating current (AC) source;
 an energy storage apparatus; and
 a rectifier circuit electrically connected to the energy storage apparatus, the rectifier circuit comprising at least one controllable solid-state switching unit; and
 a control system coupled to the rectifier circuit, the control system comprising:
  a detection circuit configured to sense one or more electrical properties; and
  logic configured to determine whether a fault condition exists based on an indication of the sensed one or more electrical properties, wherein the control system is configured to control one or more of the controllable solid-state switching units to terminate current flow to the energy storage apparatus in response to determining that a fault condition exists.

12. The system of claim 11, further comprising an inverter electrically connected to the energy storage apparatus.

13. The system of claim 11, wherein the input is configured for connection to a multi-phase AC source; the rectifier circuit comprises a plurality of solid-state switching units; and each solid-state switching unit is associated with one phase.

14. The system of claim 11, wherein each solid-state switching unit is configured to withstand voltage in a first direction and a second direction.

15. The system of claim 14, wherein each solid-state switching unit comprises a first switching unit configured to terminate current that flows in the first direction, and a second switching unit configured to terminal current that flows in the second direction.

16. The system of claim 15, wherein each first switching unit comprises two transistors, and each second switching unit comprises two transistors.

17. The system of claim 15, wherein each first switching unit comprises more transistors than any second switching unit.

18. The system of claim 11, wherein the detection circuit is configured to produce an indication of whether or not an unbalanced condition exists in the AC source, and the logic determines that the fault condition exists when the detection circuit produces the indication that the unbalanced condition exists in the AC source.

19. A control system comprising:
 a detection circuit configured to sense one or more electrical properties in a power conversion circuit; and
 logic operably connected to the detection circuit and configured to determine whether a fault condition exists based on an indication of the sensed one or more electrical properties; and wherein
 the control system is configured to control one or more controllable solid-state switching units in a rectifier of the power conversion circuit to terminate current flow to an energy storage apparatus that is electrically connected to the rectifier in response to determining that a fault condition exists.

20. The control system of claim 19, wherein the detection circuit is configured to sense a voltage across each of two transistors in each of the one or more of the controllable solid-state switching units, and the logic is configured to determine a conduction current for each transistor and to compare at least some of the determined conduction currents to a pre-determined threshold to determine whether the fault condition exists.

* * * * *